United States Patent [19]

Lockett, Jr.

[11] Patent Number: 4,714,542

[45] Date of Patent: Dec. 22, 1987

[54] DISTILLATION VAPOR AND FEED MIXING PROCESS

[75] Inventor: William Lockett, Jr., Bernardsville, N.J.

[73] Assignee: Encon Associates Inc., Bernardsville, N.J.

[21] Appl. No.: 816,416

[22] Filed: Jan. 6, 1986

[51] Int. Cl.⁴ .............................................. B01D 3/30
[52] U.S. Cl. ................................... 208/347; 196/127; 202/158; 202/162
[58] Field of Search ....................... 208/347, 350, 351; 196/126, 127, 135; 202/158, 162

[56] References Cited

U.S. PATENT DOCUMENTS

| | | | |
|---|---|---|---|
| 2,235,329 | 3/1941 | Ocon | 196/127 X |
| 3,133,014 | 5/1964 | Cross, Jr. | 196/127 X |
| 3,544,428 | 12/1970 | Mellbom | 202/158 X |

FOREIGN PATENT DOCUMENTS 485764  9/1973  U.S.S.R. .............................. 196/127

*Primary Examiner*—Helen M. S. Sneed
*Assistant Examiner*—Glenn Caldarola
*Attorney, Agent, or Firm*—Kenneth P. Glynn

[57] ABSTRACT

The present invention is a distillation vapor and feed mixing and subsequent separation process and apparatus involving the introduction of a vaporizing liquid feed into a flash zone via a tangential nozzle into a mixing and separation chamber which directs the feed into a circumferential path to enhance mixing, and the redirection of rising vapors from the distillation below the flash zone by baffling these vapors into the chamber inlet. The rising vapors are inspirated by the high velocity feed at the inlet side of the chamber and intimate contact and mixing of the rising vapors with the vaporizing feed are enhanced by creating a spinning action. Preferably, the chamber runs peripherally and slightly downward along the inside wall of the distillation column along an arc no greater than 360°. Alternatively, the mixing section of the mixing and separation chamber may be located outside of the distillation tower and the feed, passing through a jet ejector would inspirate the rising vapors. Increasing contacting and mixing efficiency in a distillation flash zone increases the yield of more valuable overhead product for the same energy input or permits lower energy input for constant separation between overheads and bottoms in the flash zone.

10 Claims, 6 Drawing Figures

DISTILLATION VAPOR AND FEED MIXING PROCESS

BACKGROUND OF THE INVENTION

1. Field of the Invention

The present invention relates to improved efficiency of mixing and subsequent separation of distillation rising vapors with input feed and in most cases, to achieve lower partial pressure for vaporizing more feed entering the flash zone to increase the yield of more valuable lighter products for constant energy input; or, conversely, reduce energy input for constant yield. It is directed toward a process and an apparatus which involves the use of a mixing and separation chamber at the feed nozzle of the distillation column. The process and apparatus are applicable to any distillation process but are particularly useful in crude oil distillation, primary and secondary distillation.

2. Prior Art Statement

Historically, in a distillation process, a vaporizing feedstock has been fed into the distillation column at what is called the "flash zone" by pressurized injection, typically through a feed flush or tangential nozzle which merely sprayed or otherwise injected the vaporizing feed out over the rising vapors from the fractionation or stripping section located below the flash zone. While this technique was used for a long time and distillation was achieved, it was recognized that much of the hot liquid feed remained as droplets and not all of the feed made contact with all of the rising vapors. The actual efficiency of mixing and contacting the rising vapors with the vaporizing feed was impaired and excessive amounts of the heavy liquid fractions were carried upward to fractionation sections above the flash zone.

Subsequently, it was discovered that the liquid droplets could be more efficiently separated from the feed vapors by introducing the feed through a tangential feed nozzle into an open bottom chamber or baffle which was circumferential. Advantageously, an open bottom chamber was downwardly sloped and did not make a complete turn within the distillation column. It is recognized that the centrifugal motion of the hot feed and the outward (and slightly downward) turbulent spray of the vaporizing feed into the rising vapors coalesced the droplets so that fewer liquid drops are entrained and carried above the flash zone. While this prior art improvement somewhat enhanced the separation of liquid droplets from the rising vapors and feed vapors, it forced most of the droplets to follow the circumferential wall of the flash zone, and did not fully address the problem of large portions of the liquid feed separating from its own forming feed vapors before those feed liquid and vapors mixed with the rising vapors and this resulted in poor contact. Thus, the improved system decreased entrainment of rising droplets but didn't eliminate, and possibly magnified, the problems of "falling" liquid feed and inefficient mixture of feed liquid and vapors with rising vapors from the stripping section below the flash zone.

BRIEF SUMMARY OF THE INVENTION

The present invention is a distillation vapor and feed mixing and separation process and an apparatus involving the introduction of a vaporizing feed to enhance their contacting, mixing and separation with the rising vapors to the flash zone. All of the rising vapors are mixed with the hot feed in a special mixing and separation chamber, thereby minimizing prior art problems while enhancing the mixing and contacting efficiencies of the rising vapors and the feed. Maximizing the mixing efficiency of the rising vapors with the vaporizing feed results in a greater partial pressure reduction on the vaporizing feed to increase the quantity of feed vaporized. This increases the yield of more valuable overhead product for the same energy input to the flash zone. For example, in a primary crude distillation flash zone, for constant energy input, calculations show that the increased yield of more valuable products may be increased, for example, by at least 2 percent.

BRIEF DESCRIPTION OF THE DRAWINGS

The invention is more fully understood and variations encompassed by the present invention may be seen in light of the following detailed description of the invention, taken in conjunction with the drawings, wherein.

DETAILED DESCRIPTION OF THE INVENTION

Figure 1:
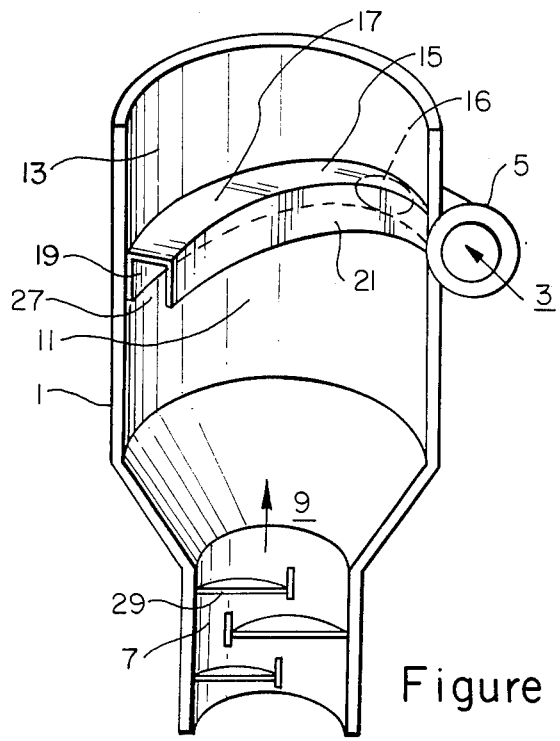
FIG. 1 represents a cut oblique view of a distillation column using a feed chamber of the prior art.

Referring now to FIG. 1, distillation column 1 is shown with hot liquid feed 3 entering nozzle 5. Nozzle 5 is shown tangentially arranged with respect to column 1 (although flush nozzles or other angles are sometimes used). The particular column 1 shown here is circular in cross-section, although other configurations such as conical or hexagonal could be used. Also, the column 1 could be for any distillation, stripping, fractionating or other gas-liquid separation column, and thus, the term "distillation column" as used herein should be accordingly broadly construed. Column 1, for purposes of illustration, is a section of a primary crude oil distillation column, although it could be a primary fractionation following a catalytic cracking, steam reforming or other process, or a secondary or vacuum distillation column.

Stripping section 7 with trays 29 has rising vapor 9, e.g. distillation vapor or steam-rich vapor (contains hydrocarbon vapors stripped from the bottoms product), passing upwardly therethrough and into the lower part of the flash zone 11. It then passes into the upper part of the flash zone 13 and into the upper fractionating area, as is well recognized in the art.

Prior art vaporizing feed chamber 15 is shown and makes a peripheral turn inside the column 1 and along its perimeter for an arc distance less than a full turn. Prior art vaporizing feedchamber 15 has top portion 17, and side walls 19 and 21 and has no bottom. Vaporizing feed chamber 15 is connected to nozzle 5 via port 16 and has an open downstream end 27 within the lower part of the flash zone 11. Typically, feed 3 enters feed chamber 15 circumferentially and is directed slightly downwardly in a swirling manner primarily to minimize the entrainment of liquid droplets in the vapors leaving upward from the lower part of the flash zone 11. Centrifugal action forces a large percentage of the heavier liquid feed droplets to follow the inside wall of the flash zone and, thus, the liquid flowing on the wall does not mix with all of the rising vapors passing upward in the center of the flash zone.

Figure 2:
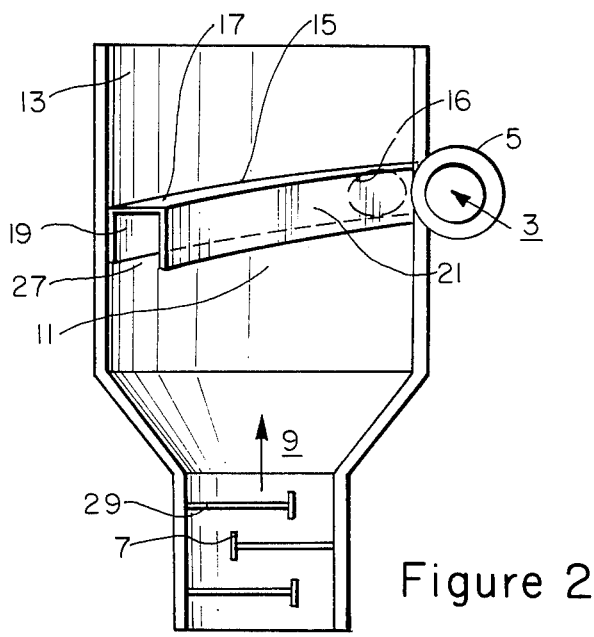
FIG. 2 shows a schematic front cut view of the FIG. 1 prior art device.

FIG. 2 shows a frontal cut schematic view of the prior art apparatus of FIG. 1, with like parts like numbered.

Figure 3:
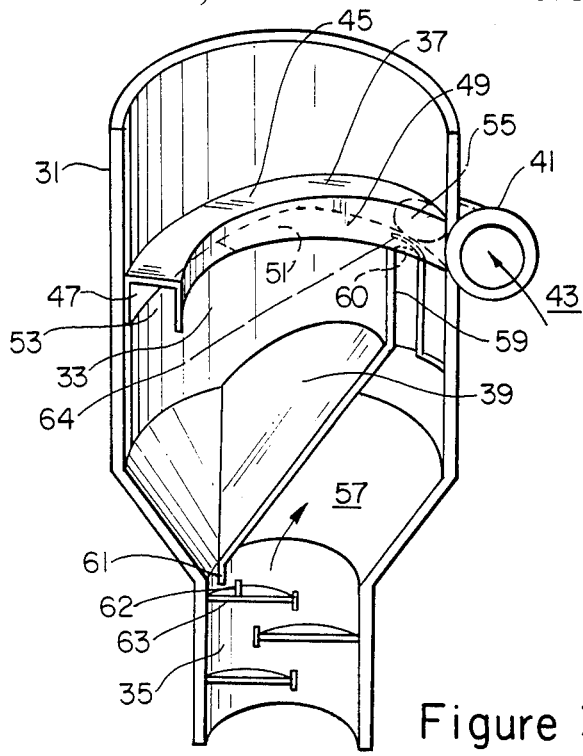
FIG. 3 illustrates a cut oblique view of one embodiment of a distillation column using a mixing chamber and rising vapor baffle of the present invention.

FIG. 3 illustrates one prefered embodiment of the present invention. Shown is distillation column 31 with flash zone 33 and stripping zone 35. Also shown are mixing and separation chamber 37 and partition baffle 39. Tangential nozzle 41 is shown wherein vaporizing feed 43 is fed into column 31 via nozzle 41 and mixing and separation chamber 37 and into flash zone 33. Chamber 37 has a port 55 at its upstream end and an open downstream end 53. It also has a top portion 45, side portions 47 and 49 and a bottom portion 51. Mixing and separation chamber 37 has, in this example, a rectangular cross-section. However, it could be of a circular cross-section, i.e. tubular, or otherwise, and is generally sloped, as a matter of design, so that efficient flow and mixing are achieved.

Bottom portion 51 could be the same length as top and side portions 45, 47 and 49, and advantageously is shorter in length so that the open downstream end 53 of mixing and separation chamber 37 has an open or dropped out bottom. This enhances more flashing of the feed 43 because of more complete mixing with rising vapors 57. In this case, rising vapors 57 flow out of stripping section 35 and are redirected into chamber 37 by partition baffle 39 and the connecting tube section 59 of partition baffle 39. All of rising vapors 57 move upward from stripping section 35 and trays 63, along the bottom of partition baffle 39 and up its tube section 59 into the upstream end of chamber 37. The vapors enter the chamber from the bottom through port 60 where a deflector baffle 64 is used to accelerate the feed 43 to have a jetting action for inspirating the rising vapors 57. The deflector baffle 64 is also used to direct the liquid feed droplets in a spinning motion to increase mixing of feed with rising vapors. Feed 43 and rising vapors 57 mix vigorously as they flow together in a swirling fashion through chamber 37, and out of chamber 37's open downstream end 53 to flash zone 33, where the liquid gravitates to the bottoms product stripper tray 63, and the vapors pass upward to the fractionation areas above the flash zone. Thus, the rising vapors are directed to the inlet side or bottom of the present invention apparatus which incorporates baffles in an eduction promoting arrangement plus a chamber which directs the feed plus distillation vapor mixture into a circumferential and/or toroidal path to enhance mixing and promote intimate contact of the feed and distillation rising vapors and achieve the lowest partial pressure for the vaporizing feed before separating resultant liquid and vapors while also retaining the coalescing of liquid droplets and spray so as to minimize entrainment of the heavier fractions above the flash zone.

Figure 4:
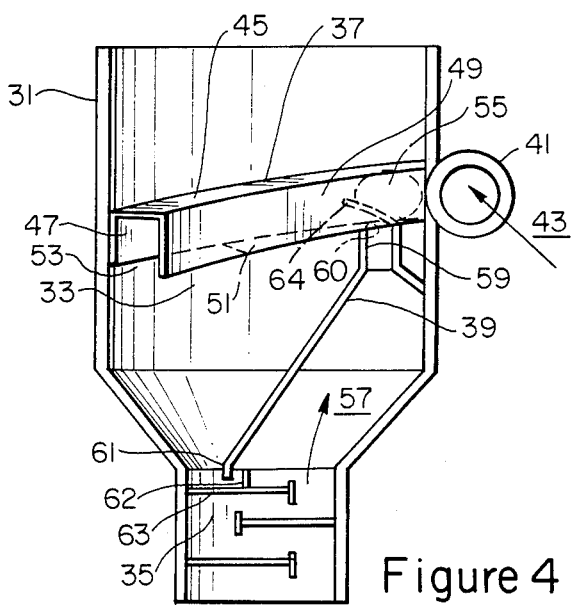
FIG. 4 shows a schematic front cut view of the present invention device of FIG. 3.

A front cut schematic view of the apparatus and process of FIG. 3 is shown in FIG. 4 wherein like parts are like numbered. In general, the mixing and separation chamber used in the apparatus and process of the present invention is as described above and below, and is advantageously arcuated less than 360° of circumference in length, especially between 90° and 270° in length. The bottom portion of the mixing and separation chamber may be the same length or shorter than the length of the chamber, and is preferably shorter, e.g. 40° to 200° in length. Preferably, the mixing and separation chamber is oriented slightly downwardly from its upstream end to its downstream end. Although shown rectangular in cross-section, the chamber could be circular or oval to enhance the spinning.

To enhance liquid separation and flow to the stripping section 35 while preventing vapor bypassing of the mixing zone, a downcomer 61 should be installed at the bottom of partition baffle 39. To further enhance sealing of this downcomer, it may be desirable to install an inlet weir 62 on the top of stripping tray 63.

Figure 5:
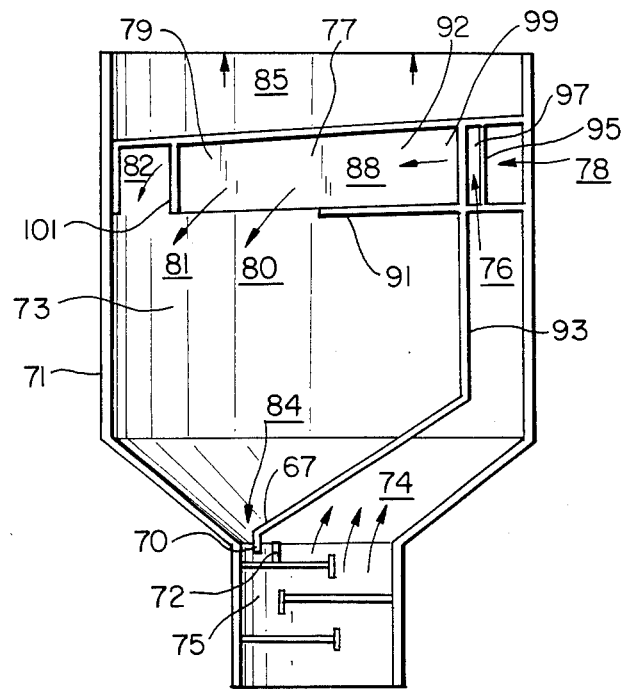
FIG. 5 illustrates a schematic front cut view of another embodiment of the device of the present invention; and, FIG. 6 shows a top view of the device shown in FIG. 5.
Figure 6:
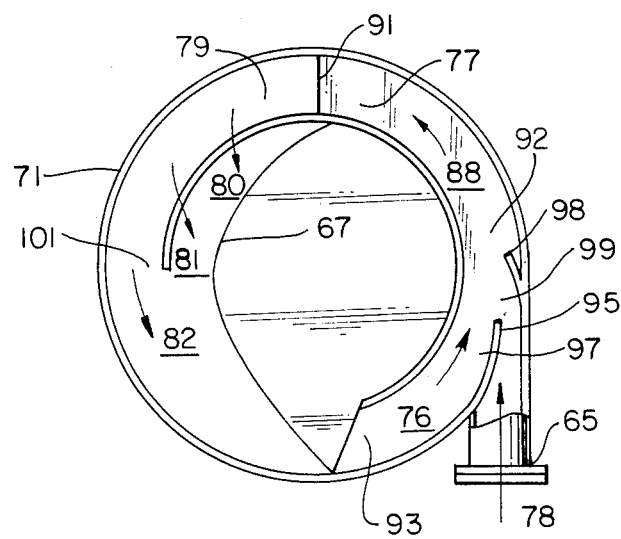

FIGS. 5 and 6 show cut side and cut top views of an alternative embodiment of the present invention apparatus. Distillation column 71 is shown in part and contains flash zone 73 and stripping section 75 (trays not shown). Mixing and separation chamber 77, feed nozzle 65 and partition baffle 67 work together to enhance complete contacting of the rising vapors 74 and 76 and the liquid feed 78. Feed nozzle 65 (FIG. 6) is connected to mixing and separation chamber 77, and vaporizing liquid feed 78 passes into nozzle 65 and then into chamber 77 as shown. At chamber 77's open upstream end 99 is rising vapors inlet 97 with deflection baffle 95. The deflection baffle 95 may be designed to provide a jetting and spinning action from the high velocity feed 78 to insprirate the rising vapors 76. Also included in the mixing zone is a second deflection baffle 98 to create a spinning action in chamber 77. Partition baffle 67 physically divides most of the distillation column 71 at the bottom of flash zone 73 as shown. In this embodiment, partition baffle 67 includes a component which has an upwardly sloped restricted section 93 that is connected to rising vapors inlet 97 of chamber 77. Thus, vapors 74 which rise up from stripping section 75 are redirected to rising vapors inlet 97 (rising vapors 76) due to the configuration of partition baffle 67. In chamber 77, rising vapors 76 contact and mix intimately with vaporizing liquid feed 78 and the mixture 88 passes to the separation section 79 of chamber 77 to open downstream end 101 where the flashed mixture enters flash zone 73 with its vapors rising to fractionation sections (not shown) located above flash zone 73 as characterized by flash zone vapors 85. Mixing section 92 of chamber 77 has a bottom 91 which is preferably shorter in length than the mixing and separation chamber 77, and mixture 88, therefore, initially separates in section 79 where the most of vapors enter into flash zone 73 as examplified by flow arrows 80, 81 and 82. A large portion of the liquid which is not "flashed" swirls around the inner flash zone wall to fall down into stripping section 75 as examplified by flow arrow 84. This liquid enters a downcomer seal system noted in FIGS. 3 and 4, and are shown here as downcomer 70 and inlet weir 72. These function in the same manner as downcomer 61 and inlet weir 62 shown in FIGS. 3 and 4.

This is one of several physical arrangements that can be used to segregate the rising stripper vapors and introduce them into the mixing and separation chamber with the vaporizing feed. For instance, an inverted conical baffle can be used to collect the vapors above the stripper and funnel them into a pipe that curves in the flash zone to discharge the vapors at the mixing chamber inlet. Alternatively, the pipe could be eliminated and a flat or curved baffle could be connected directly to the mixing and separation chamber to acheive the desired result.

Although normally less attractive, certain situations may justify locating the mixing chamber externally from the tower, e.g. outside of the flash zone. For example, referring to FIG. 3, pipe 59 containing the rising vapors 57 would pass through the distillation column wall 31 and join the vaporizing feed 42 before the tangential nozzle 41. An eductor or jet ejector could be used to inspirate the vapors 57 into the feed. The resultant mixture would then pass into the tower through a tangential separation chamber having a top portion 45 and side portions 47 and 49 and no bottom portion. Thus, in all embodiments, the mixing and separation chamber is at least partially located within the tower, and preferably entirely within the tower as discussed above.

Obviously, numerous modifications and variations of the present invention are possible in light of the above teachings. It is therefore to be understood that within the scope of the appended claims, the invention may be practiced otherwise than as specifically described herein.

What is claimed is:

1. In a distillation process wherein vaporizing liquid feed is being fed into a flash zone located within a column and contacted with rising vapors from the stripping section therein an improvement, for more complete mixing of the vaporizing liquid feed with the rising vapors from the stripping section in order to achieve a lower partial pressure effect on the feed to improve overall fractionation-energy efficiency, to minimize entrainment of heavy liquid dropleets in vapors leaving the flash zone, and, to improve the flow of liquid on the top stripping tray, which improvement comprises:
   (a) introducing the vaporizing liquid into the flash zone located within the column at an angle approximately tangential to the column via a nozzle and through a mixing and separation chamber having a port at its upstream end at the nozzle and an open downstream end at the flash zone, said chamber being constructed to approximately conform to the inside cross-sectional configuration of the column at the flash zone, and having side walls, a bottom and a top and having a rising vapors inlet port near the upstream end, said chamber having a length which is less than the full perimeter of the column at the flash zone;
   (b) enhancing the efficiency of the contacting and mixing of all of the rising vapors with the vaporizing liquid feed by redirecting all of the rising vapors from the column into said chamber near its upstream end by physically partitioning at least a part of the column with a partition baffle located in the flash zone to direct the rising vapors to the rising vapors inlet of said chamber; and,
   (c) further enhancing the efficiency of the contacting and mixing of all of the rising vapors with the vaporizing liquid feed by creating a spinning action with a deflector baffle located at said rising vapors inlet whereby high velocity feed inspirates all of the rising vapors so as to create the spinning action in said chamber and so as to thereby effect intimate mixing of all rising vapors from the stripping section with the vaporizing liquid feed.

2. The process of claim 1 wherein the column is circular in its cross-sectional configuration at the flash zone and said chamber is arcuated and makes an arc of less than 360° and is oriented slightly downward from its upstream end to its downstream end.

3. The process of claim 2 wherein said chamber makes an arc of between 60° and 270°.

4. The process of claim 3 wherein the bottom of said chamber makes an arc of between 40° and 200°.

5. The process of claim 1 wherein the distillation process is a primary atmospheric distillation process.

6. The process of claim 1 wherein the distillation process is a secondary vacuum distillation process.

7. The process of claim 1 wherein the distillation is crude oil distillation, the vaporizing liquid feed is crude oil and the rising vapors are steam-rich bottoms hydrocarbon vapors.

8. The process of claim 7 wherein the column is circular in its cross-sectional configuration at the flash zone and said chamber is arcuated and makes an arc of less than 360°.

9. The process of claim 8 wherein said chamber makes an arc of between 60° and 270° and is oriented slightly downward from its upstream end to its downstream end.

10. The process of claim 9 wherein the bottom of said chamber makes an arc of between 40° and 200°.

* * * * *